United States Patent [19]

Nozawa

[11] Patent Number: 4,832,203

[45] Date of Patent: May 23, 1989

[54] SYSTEM FOR HANDLING BAGGAGES OF PASSENGERS

[75] Inventor: Hideaki Nozawa, 7-3 Higashiyaguchi 3-chome, Ohta-ku, Tokyo 146, Japan

[73] Assignees: Shiroh Shirakawa; Hideaki Nozawa, both of Tokyo, Japan

[21] Appl. No.: 200,263

[22] Filed: May 31, 1988

[51] Int. Cl.⁴ .............................................. B07C 5/02
[52] U.S. Cl. ................................. 209/3.3; 198/349; 209/583; 414/280
[58] Field of Search ............... 198/394, 349; 209/3.3, 209/569, 583; 414/277, 280, 283, 331; 901/1

[56] References Cited

U.S. PATENT DOCUMENTS

| | | | |
|---|---|---|---|
| 2,362,683 | 11/1944 | Weinberg | 209/3.3 |
| 3,260,349 | 7/1966 | Meer | 209/569 |
| 3,446,351 | 5/1969 | Born | 209/3.3 |
| 3,542,215 | 11/1970 | Fromme | 198/349 |
| 3,610,159 | 10/1971 | Fickenscher | 198/349 |
| 3,648,838 | 3/1972 | Hiromura | 209/583 |
| 3,949,192 | 4/1976 | Kuwertz et al. | 198/349 |
| 4,776,464 | 10/1988 | Miller et al. | 209/3.3 |

Primary Examiner—Michael W. Ball
Assistant Examiner—Steven D. Maki
Attorney, Agent, or Firm—Armstrong, Nikaido, Marmelstein, Kubovcik & Murray

[57] ABSTRACT

A tag having a tag body and a suspension tape is attached to a baggage. The baggage is conveyed by a conveyor. During the conveying the tag is caught by a catcher. A carrier is provided for gripping the tag caught by the catcher. The carrier is driven by a motor to carry the baggage. A loader is provided for loading the carried baggage in a container.

5 Claims, 10 Drawing Sheets

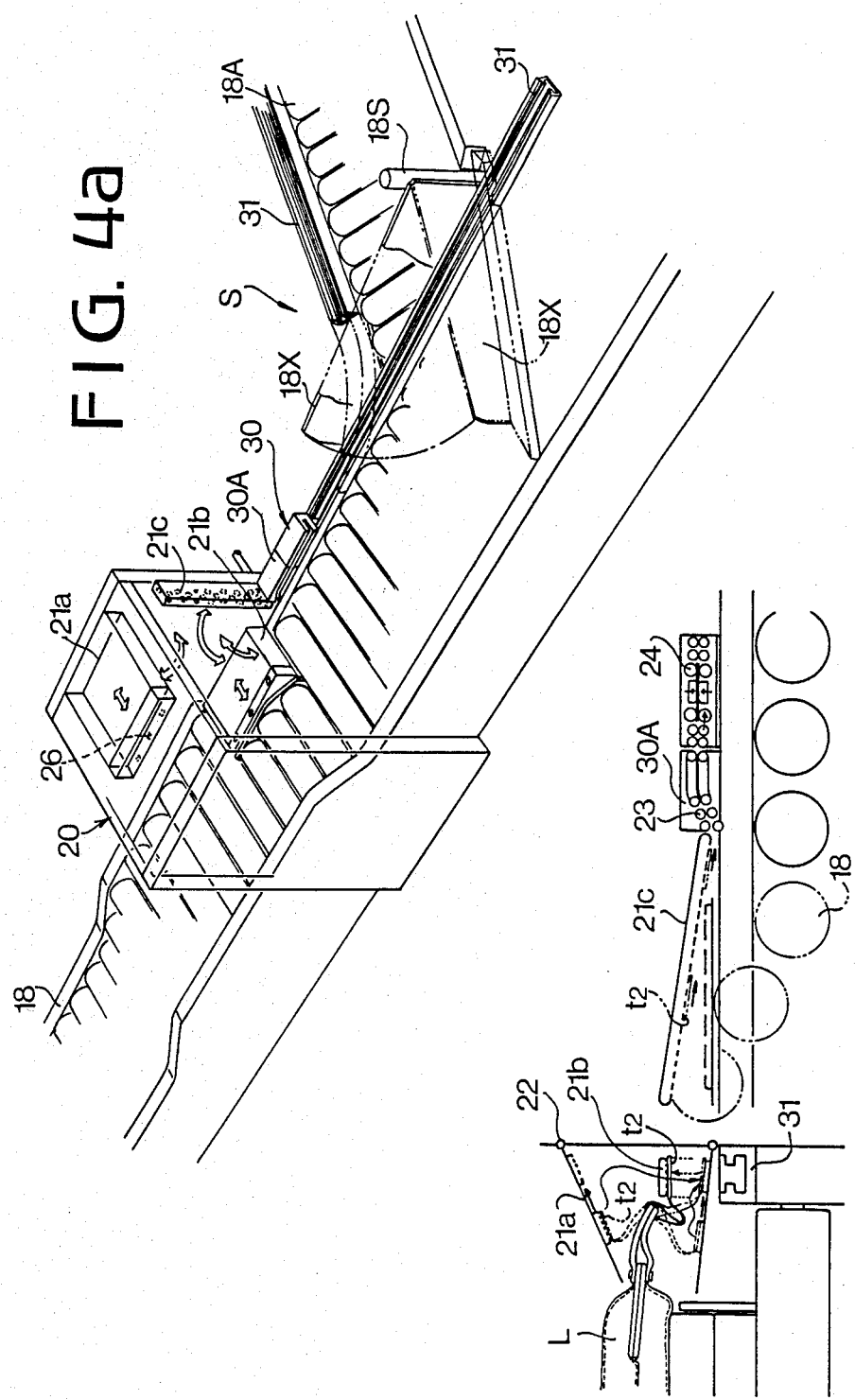

SYSTEM FOR HANDLING BAGGAGES OF PASSENGERS

BACKGROUND OF THE INVENTION

The present invention relates to a system for handling baggages of passengers in an airport, and more particularly to a system for carrying a baggage and for loading the baggage into a container.

Heretofore, baggages are handled as follows. A counter clerk tags a baggage with a destination airport name and a baggage number at check-in. Checked baggages are sorted according to the destination. The sorted baggages are carried by conveyors to a container station and loaded into a corresponding container by porters.

Such a conventional system requires a long time for handling one baggage. Accordingly, it is difficult to handle a great number of baggages within a limited short time. On the other hand, because of quick handling, there occurs troubles such as error in sorting of baggages and remains of baggages.

SUMMARY OF THE INVENTION

The object of the present invention is to provide a baggage handling system which automatically handles baggages at a high speed without troubles.

According to the present invention, there is provided a system for handling a baggage comprising a tag having a tag body and a suspension tape and having a record on the tag body which identifies the baggage, attaching means for attaching the suspension tape to the baggage, a conveyor for conveying the baggage having the tag, catcher means for catching the tag while the baggage is conveyed, a carrier for gripping the tag caught by the catcher means, a guide rail for guiding the carrier, driving means for driving the carrier along the guide rail, a loader for loading the carried baggage in a container.

In an aspect of the invention, the catcher means has vacuum guides each having a plurality of vacuum nozzles, and the carrier has wheels and is driven by an electric motor for driving the wheels.

The other objects and futures of this invention will be apparently understood from the following description with reference to the accompanying drawings.

BRIEF DESCRIPTION OF DRAWINGS

FIG. 4a is a perspective view showing a part of a conveyor;
FIGS. 4b to 4d are views showing a tag catcher.

DETAILED DESCRIPTION OF THE PREFERRED EMBODIMENT

Figure 1:
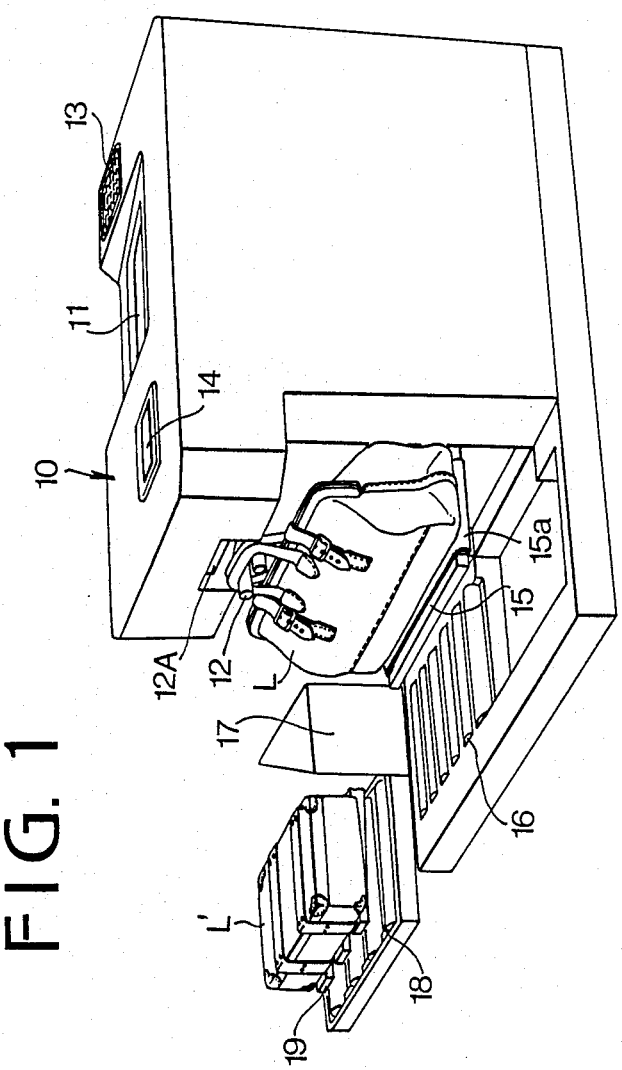
FIG. 1 is a perspective view showing a check-in counter.
Figure 2:
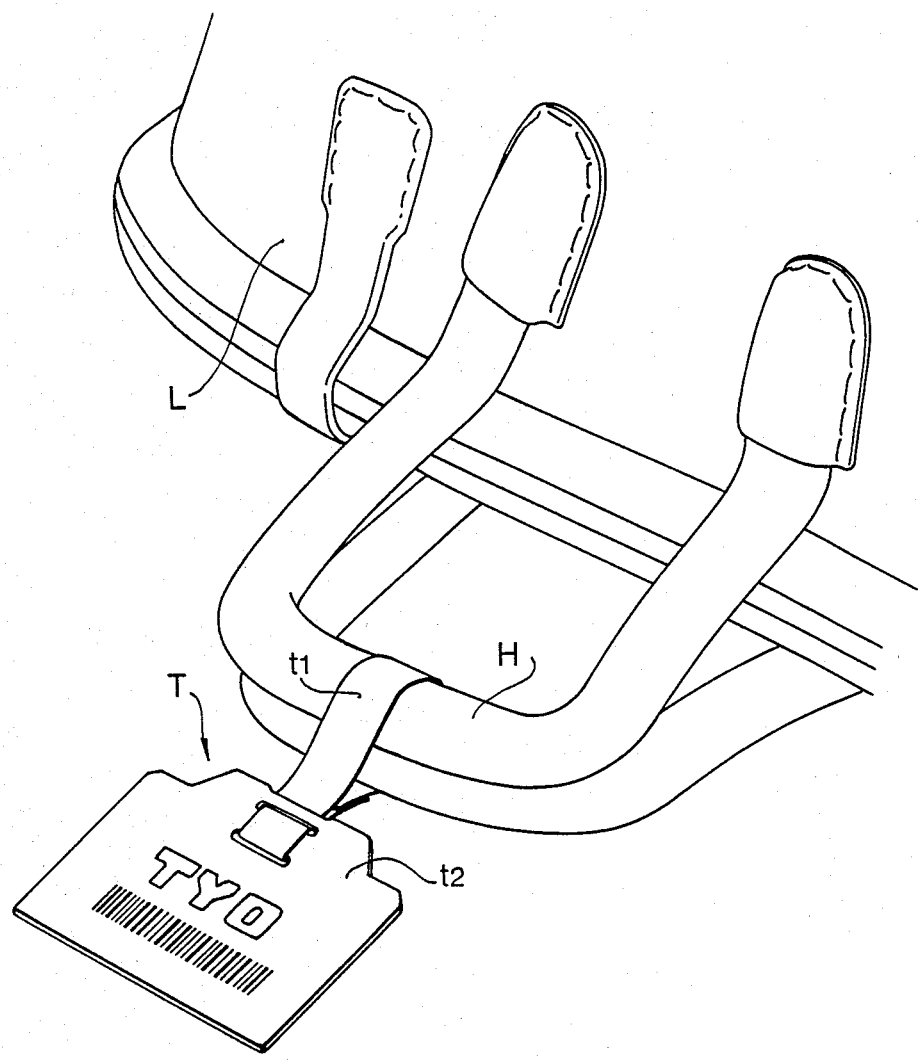
FIG. 2 is a perspective view of a tag.

Referring to FIG. 1, a check-in counter 10 has displays 11 and 14 and a keyboard 13. At the counter, letters and bar cords representing a destination airport name, seat number, baggage number, the number of baggages and others are printed on a boarding pass by operating the keyboard 13. At the same time, bar cords representing destination airport name and baggage number are printed on a tag T. The tag T comprises a suspension tape t1 and a tag body t2, as shown in FIG. 2. A baggage L is put on a lifter 15, and the lifter 15 is raised to a position where the baggage is adjacent a weighing bar 12. As shown in FIG. 1, the baggage L is hung on the weighing bar 12, thereby measuring the weight of the baggage. The weight is displayed on the display 14. After the weighing, the tag T is fed from a slit 12A and attached to a handle H of the checked baggage L as described below.

Figure 3A:
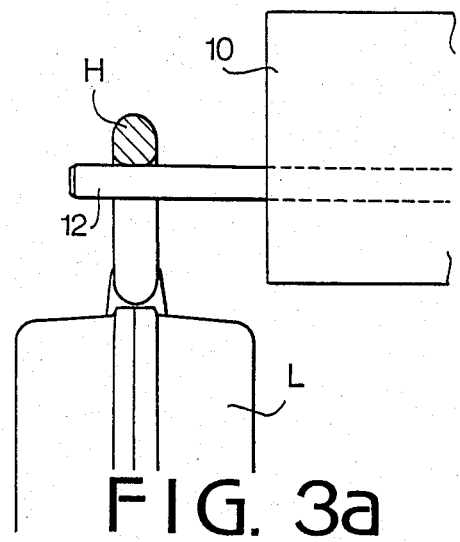
FIGS. 3a to 3d are illustrations showing operation of suspension tape engaging means.
Figure 3B:
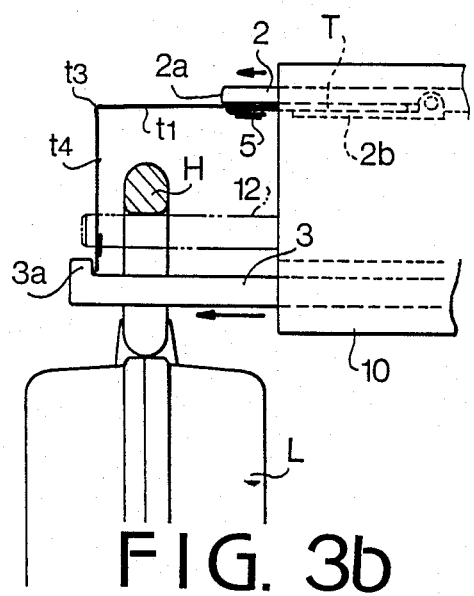
Figure 3C:
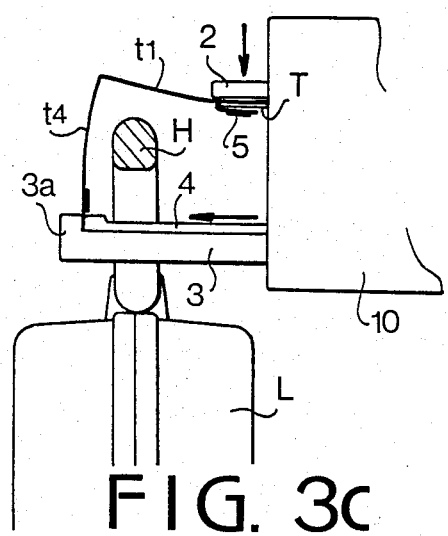
Figure 3D:
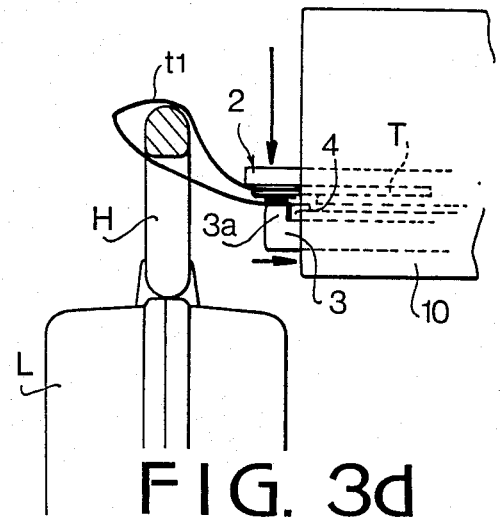

FIG. 3a shows a state that the baggage L is hung on the weighing bar 12 comprising a pair of bars. The tag T is held by a holder 2 comprising pair of plates 2a, 2b as shown in FIG. 3b. The holder 2 and a receiving member 3 are projected as shown by arrows. The tape t1 has a fold t3 at a middle portion thereof and a forward portion t4 of the tape is suspended from the fold at the outside of the handle H. The receiving member 3 is projected from the handle H and positioned adjacent the lower end of the tape t4. Thereafter, the holder 2 is slightly lowered to engage the lower end of the tape t4 with the upper side of the receiving member 3 at a position adjacent an inside wall of a projection 3a of the member 3, and then a gripper 4 is projected to grip the tape t4 between the projection 3a and the front end of the gripper 4. Then, the holder 2 is lowered, and the receiving member 3 and gripper 4 are retracted, gripping the tape. The holder 2 is pressed against the gripper 4 and member 3, so that an adhesive 5 provided on the tape t1 adheres to the forward portion t4, thereby attaching the tag T to the handle H as shown in FIG. 3d. The holder 2, member 3 and gripper 4 are removed from the tag.

Thereafter, the lifter 15 is lowered and the baggage L is removed by a belt conveyor 15a provided on the lifter 15 to a conveyor 16, while the baggage L is laid down by a device (not shown). The laid baggage L' is transferred to a conveyor 18 by a fork 19.

Figure 4D:
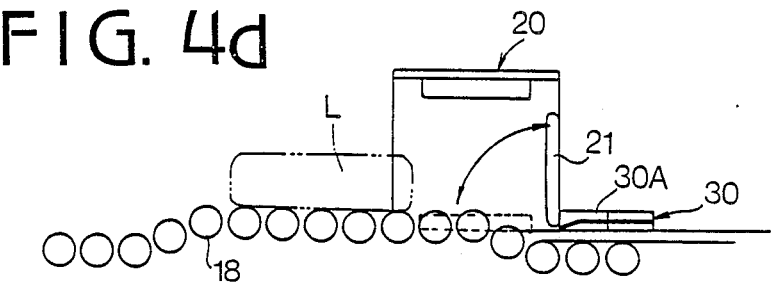

Referring to FIGS. 4a to 4d, above the conveyor 18, a tag catcher 20 is provided. The tag catcher comprises a portal frame 20a and three vacuum guides 21a, 21b and 21c, each having a plurality of vacuum nozzles 26. The vacuum guide 21a is provided to be pivoted at 22, vacuum guide 21b is laterally slidable, and vacuum guide 21c is pivoted as shown by arrows. Either of vacuum guides 21a and 21b catches the tag body t2 as shown in FIG. 4b, and then the vacuum guide 21c is rotated to a lower position to catch the tag body t2 as shown in FIG. 4c. Since the baggage L is continuously carried by the conveyor 18, the tag body t2 is moved along the vacuum guide 21c and introduced into a tag feeder 30a. The tag body passes through rollers 23 in the tag feeder 30a and introduced into a carrier 30. The carrier 30 has a plurality of nipping rollers 24 which are operated by an electromagnetic device to nip the tag body t2.

Figure 5:
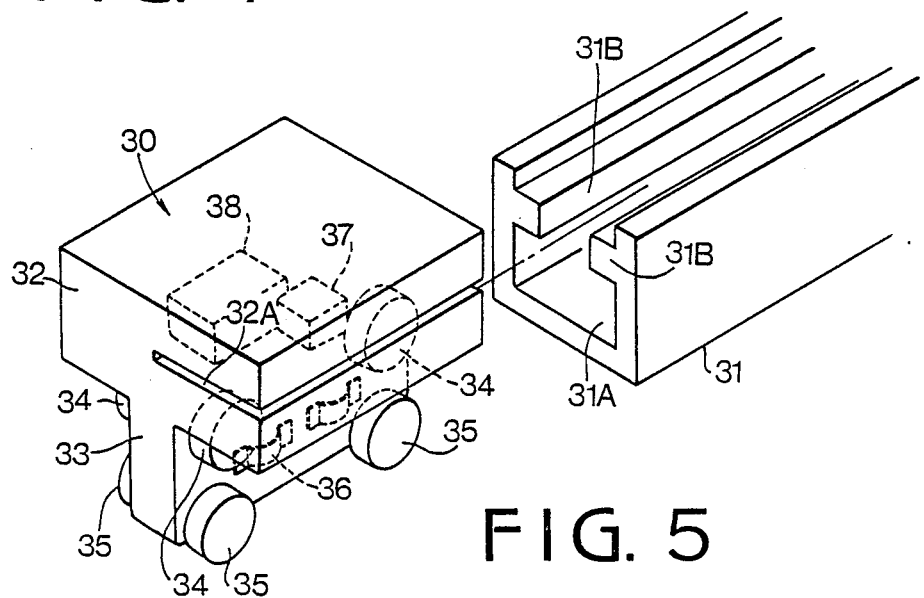
FIG. 5 is a perspective view showing a carrier and a guide rail.
Figure 6:
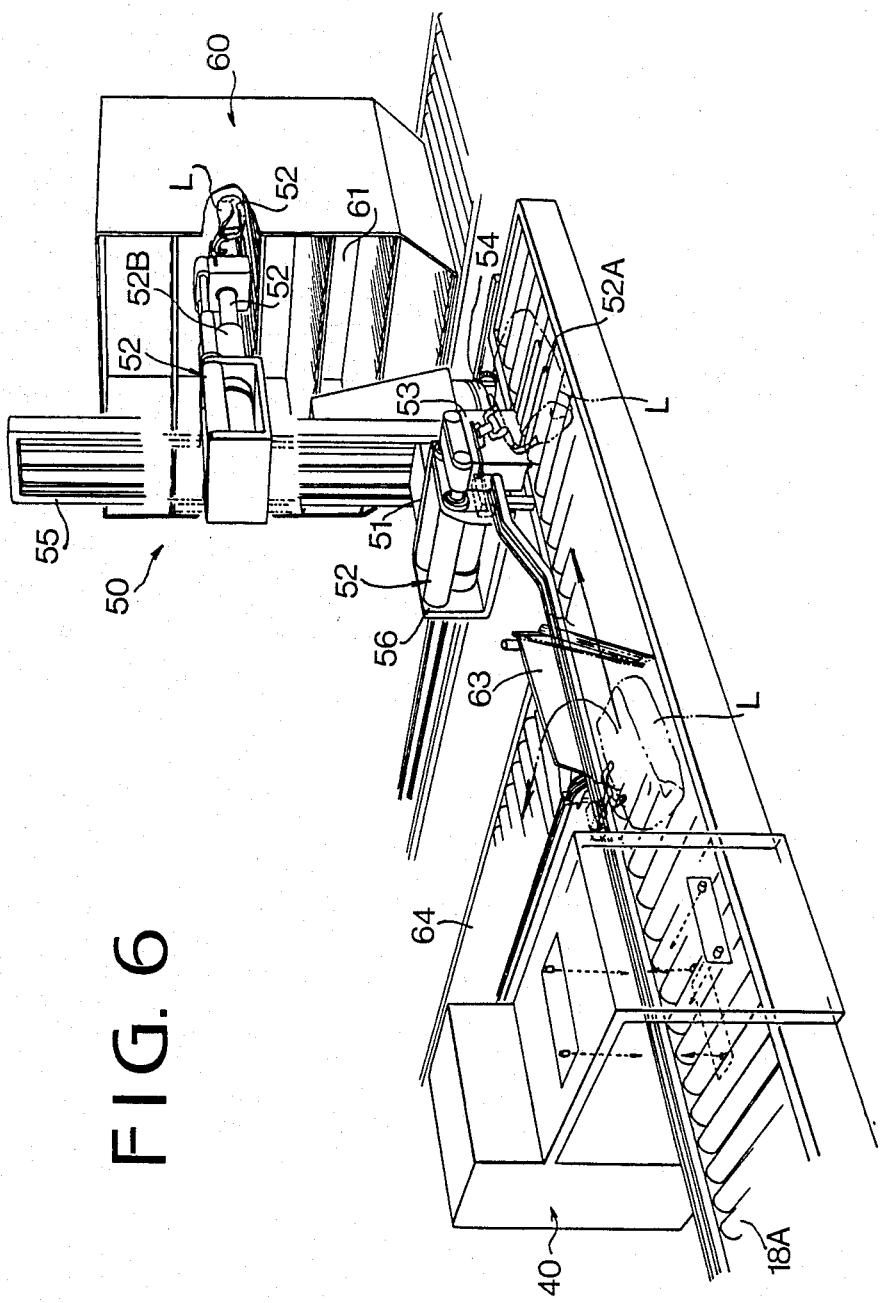
FIG. 6 is a perspective view showing a loading station.
Figure 7A:
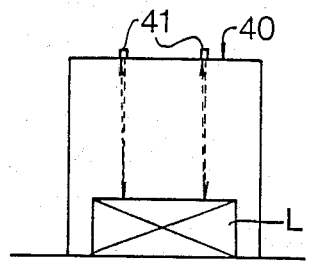
FIGS. 7a to 7c show a baggage size measuring device.
Figure 7B:
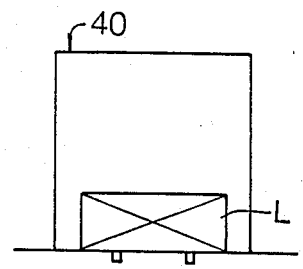
Figure 7C:
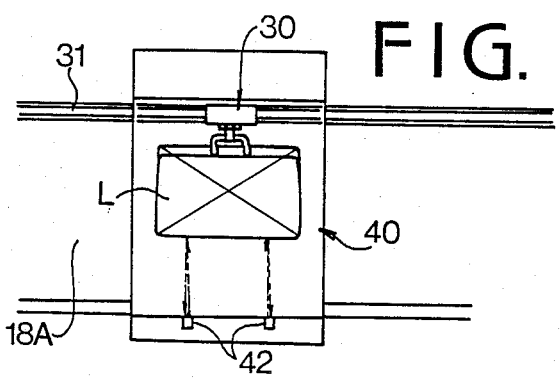

Referring to FIG. 5, the carrier 30 has a T-shaped cross section and comprises a carrier body 32, and a center leg 33. On each side of the leg 33, two pairs of wheels 34, 35 are provided. The carrier 30 is provided to travel along a guide rail 31. The guide rail has a bottom 31A, and opposite flanges 31B. Each pair of wheels 34, 35 engage with flange 31B of the guide rail 31 at upper side and underside thereof. The carrier 30 has an electric motor 38 for driving four upper wheels 34 and a card reader 37 for reading out the bar cords on the tag T. The tag body t2 is inserted into a slit 32A and gripped by the rollers 24 (FIG. 4c). On one side of the leg 33, a pair of current collector shoes 36 which engage with a contact rail (not shown) provided on an inside wall of the guide rail 31 so as to be supplied with current for operating the motor, for rotating the wheels 34. Thus, the carrier 30 is driven along the rail 31 in synchronism with the conveying speed of the conveyor 18 to carry the baggage L.

Figure 4E:
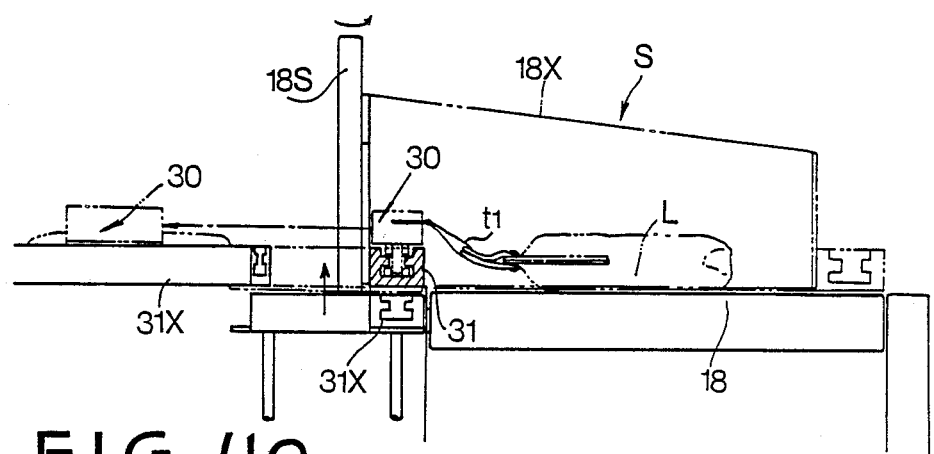
FIG. 4e is a side view showing a switch station.

There is provided a switch station S in order to carry the baggage to a container station for the destination airport. As shown in FIGS. 4a and 4e, the switch station has a switch board 18X which is secured to a shaft 18S and pivoted by the shaft as shown in FIG. 4a. The card reader 37 in the carrier 30 reads out the name of the destination airport to produce a signal. In accordance with the signal, the shaft 18S corresponding airport is rotated. Thus, the baggage L is transferred to a branch conveyor 18A and carried along a guide rail 31X. As shown in FIG. 4e, a part of conveyor 18A is provided to be lowered and raised for transferring the baggage.

Referring to FIGS. 6 and 7a to 7c, on the branch conveyor 18A, a measuring device 40 is provided. The measuring device 40 has optical measuring devices 41 and 42 for measuring the length, width and height of the baggage L. Data representing the measured size are stored in a control unit 51 of a baggage loader 50.

The loader 50 comprises a column 55 mounted on a turn table 54, a frame 56 slidably mounted on the column 55, an air cylinder device 52 having telescopic rams 52B and 52C, a holder 53, and a fork 52A projected from the frame to the conveyor 18A. The tag T of baggage L carried by the carrier 30 is transferred to the holder 53 and gripped therein. The frame 56 has a nut engaged with a lead screw provided in the column 55. The lead screw is rotated by a motor, so that the frame 56 is raised to elevate the baggage L up to a position corresponding to a space in a container 60. The space suitable for loading the baggage is selected in accordance with the data of the size stored in the control unit 51. Then, the turn table 54 turns 90 degrees, and the rams 52B and 52C are extended so that the baggage L on the fork 52A is inserted into the space in the container.

Figure 8A:
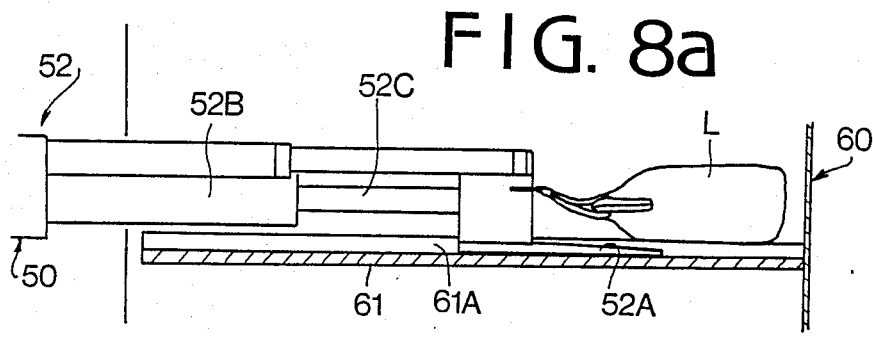
FIGS. 8a and 8b are sectional views of a part of container.
Figure 8B:
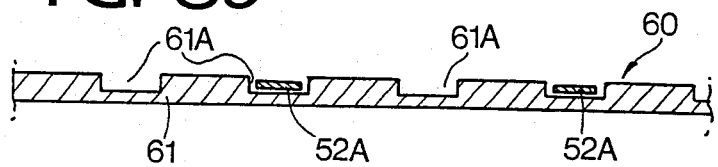

As shown in FIGS. 8a and 8b, the container 60 has trays 61. Each tray has a plurality of grooves 61A into which the fork 52A is inserted, thereby loading the baggage L on the tray. After that the fork is removed and the loader 50 is returned to the initial position.

Thus, a plurality of baggages are loaded in the container 60 which is carried to an apron and loaded on an aircraft.

A baggage having a special size is sorted by a sorting board 63 and carried by a conveyor 64 to a special container (not shown).

Although the baggage is conveyed by the conveyor 18A and the carrier 30, the baggage can be carried only by the carrier 30.

Figure 9:
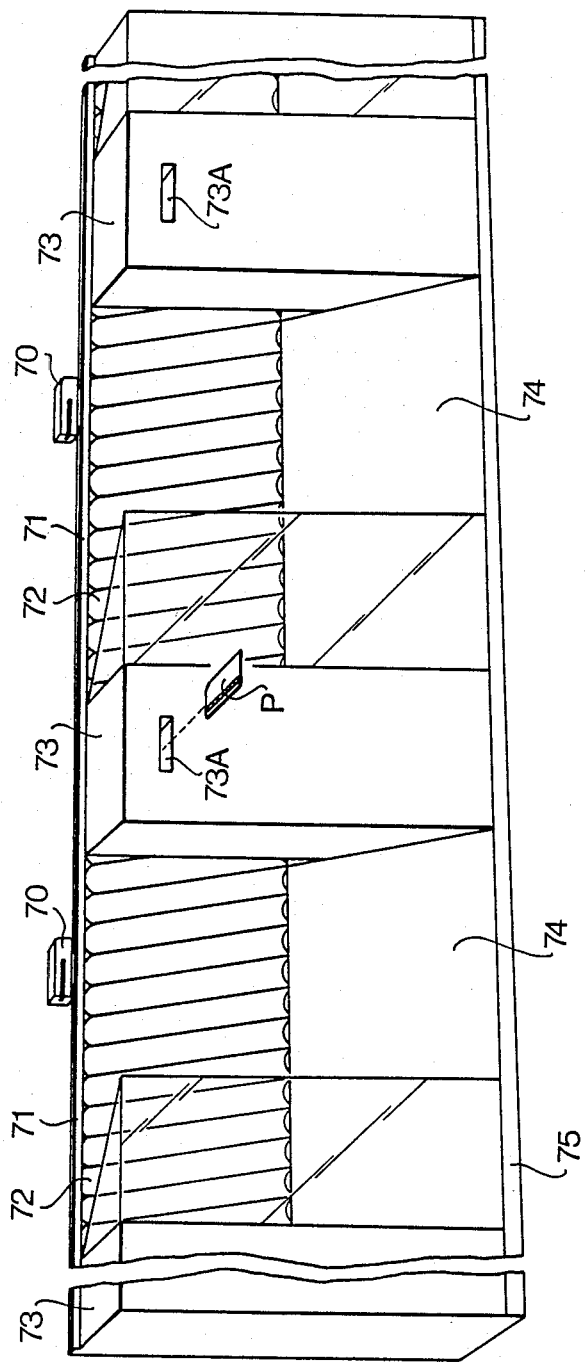
FIG. 9 shows a baggage delivering system.
Figure 10:
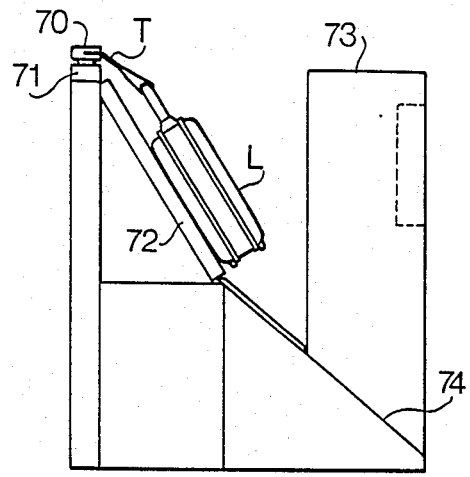
FIG. 10 is a side view of the system.
Figure 11:
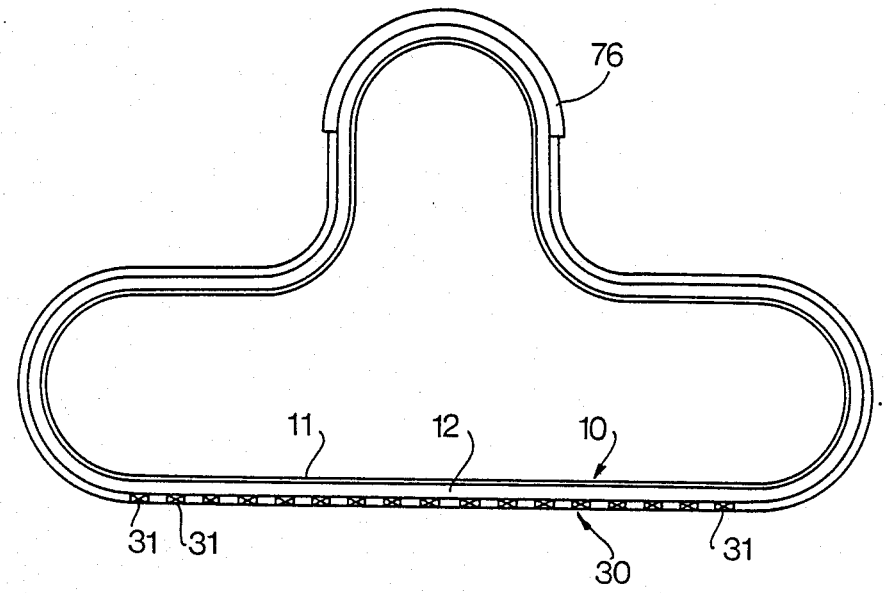
FIG. 11 is a plan view of the system.
Figure 12:
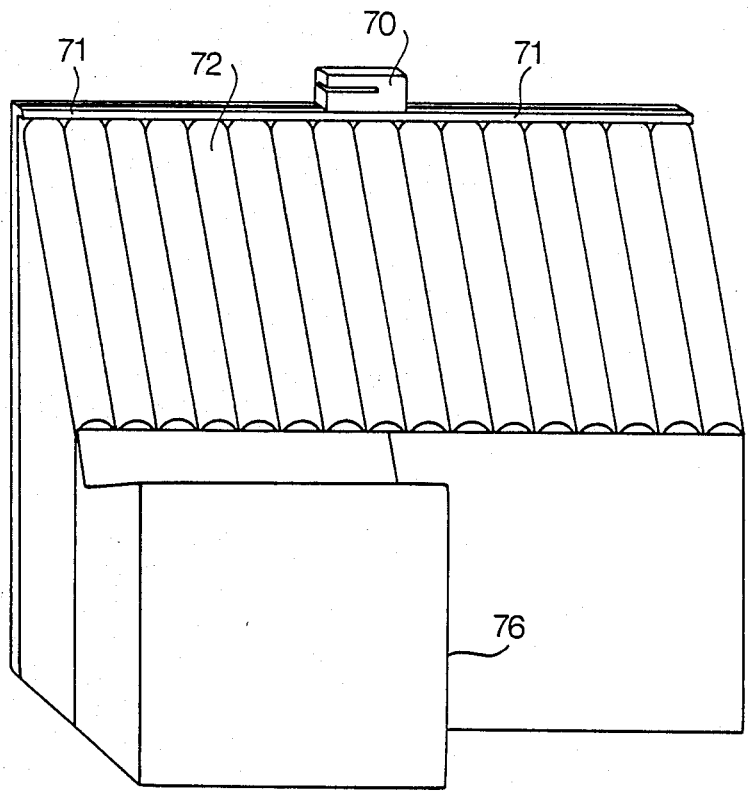
FIG. 12 shows a start station of the system.

FIGS. 9 and 10 show a baggage delivering system for an arrival baggage. The system comprises an inclined roller conveyor 72 having a guide rail 71 on the top thereof, a plurality of carriers 70, a plurality of card readers 73 disposed at regular intervals, shoots 74 between the card readers 73, and a stopper 75 provided on the lower end of the shoots 74. The guide rail 71 and carrier 70 are the same as the above described guide rail 31 and carrier 30 in construction and operation. At a starting station, a baggage rest 76 is provided for mounting arrival baggages.

The tag T of the arrival baggage on the baggage rest 76 is gripped in the carrier 70 and carried by the carrier 70 along the conveyor 72. A passenger inserts a boarding pass P into an opening 73A of one of the card readers 73. The card reader 73 reads out the bar cords representing the baggage number printed on the boarding pass P. The carrier 70 has a card reader for reading the baggage number on the tag T and produces a signal representing the baggage number. When the signal from the carrier 70 passing the card reader 73 having the boarding pass P coincides with the number of the boarding pass, the card reader 73 produces a release signal. In response to the release signal, the carrier 70 releases the baggage which falls to the stopper 75 along the shoot 74. Thus, the passenger takes out the baggages.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for handling a baggage comprising:
   a tag having a tag body and a suspension tape and having a record on the tag body which identifies the baggage;
   attaching means for attaching the suspension tape to the baggage;
   a conveyor for conveying the baggage having the attached tag; said conveyor having branch paths
   catcher means for catching the attached tag while the baggage is conveyed;
   a carrier for gripping the tag caught by the catcher means;
   said carrier having means for reading the record on said attached tag and for directing said baggage along one of said paths
   a guide rail alongside said conveyor for guiding the carrier;
   driving means for driving the carrier along the guide rail;
   a loader for loading the conveyed baggage in a container.

2. The system according to claim 1 wherein the catcher means has vacuum guides each having a plurality of vacuum nozzles.

3. The system according to claim 1 wherein the carrier has wheels and the driving means is an electric motor for driving the wheels.

4. The system according to claim 1 wherein the loader comprises a column mounted on a turn table, a frame slidably mounted on the column, an air cylinder device having telescopic rams, a holder for gripping the tag and a fork projected from the frame to the conveyor for picking up the baggage on the conveyor.

5. The system according to claim 1 further comprising switching means for sorting the baggage and a branch conveyor for conveying a sorted baggage.

* * * * *